United States Patent [19]

Smith

[11] 4,273,544
[45] Jun. 16, 1981

[54] AQUATIC RECREATIONAL VEHICLES

[76] Inventor: Charles E. Smith, 7932 Eisenhower Blvd., Bridgeport, N.Y. 13030

[21] Appl. No.: 972,204

[22] Filed: Dec. 22, 1978

[51] Int. Cl.³ .............................................. B60F 3/00
[52] U.S. Cl. ...................................... 440/30; 440/100
[58] Field of Search ....................... 115/1 R, 2, 22, 25, 115/27; 280/200, 234, 242 R, 249, 250; 440/30, 26, 100, 90

[56] References Cited

U.S. PATENT DOCUMENTS

| | | | |
|---|---|---|---|
| 95,785 | 10/1869 | Fall | 115/22 |
| 433,852 | 8/1890 | Claussen | 280/234 |
| 882,248 | 3/1908 | Haas | 280/242 R X |
| 1,083,115 | 12/1913 | Mallory | 115/2 |
| 3,823,959 | 7/1974 | Winters | 280/234 |
| 3,910,599 | 10/1975 | Thomas | 280/234 |
| 4,147,370 | 4/1979 | Lindsey, Jr. | 280/234 |
| 4,152,005 | 5/1979 | Vanore | 280/234 |

Primary Examiner—Douglas C. Butler

[57] ABSTRACT

A recreational vehicle for transporting one or more riders upon a body of water with power supplied by the rider(s) to both a pair of front and a pair of rear wheels which have sufficient buoyancy to support the vehicle and rider(s), preferably with all non-rotating above the surface of the water. One or more gear members, disclosed in several embodiments, are mounted on the vehicle frame for rotation by the rider(s) about an axis parallel to and intermediate of the front and rear axles. A device is provided for transmitting rotation of the gear member(s) to the axles and wheels in one or both directions. In alternate versions, the left and right wheels on one or both axles may be rotated independently for steering.

9 Claims, 6 Drawing Figures

AQUATIC RECREATIONAL VEHICLES

BACKGROUND OF THE INVENTION

The present invention relates to aquatic recreational vehicles powered by one or more riders, and more specifically to buoyant vehicles having at least two pairs of wheels rotatable by movement of one or more gear members by one or more riders.

In applicant's U.S. Pat. No. 3,965,843 is disclosed apparatus for transporting persons or motor vehicles over water by motive power supplied to a system of endless belts which encircle buoyant cylinders or drums. Other examples of prior art are discussed in said patent, and other prior U.S. patents disclosing aquatic vehicles propelled by hand or foot motion of a rider are U.S. Pat. Nos. 2,505,721, 1,104,229 and 95,785.

It is a principal object of the present invention to provide novel apparatus in the nature of operator-propelled aquatic vehicles which are of rugged and durable, yet relatively simple and inexpensive construction.

A further object is to provide novel recreational aquatic vehicles having mechanism which allows movement at high speeds over a body of water although the sole motive power is provided by hand and/or foot motion of one or more riders.

Other objects will in part be obvious and will in part appear hereinafter.

SUMMARY OF THE INVENTION

In accordance with the foregoing objects, the invention comprises a vehicle having at least two pairs of buoyant wheels, mounted on front and rear axles, and rotatable to propel the vehicle across the surface of a body of water. The buoyant wheels are coupled to gear members which are mounted for rotation by physical power provided by the rider(s). In a first embodiment, a drum is mounted for rotation about an axis midway between and above the axes of the front and rear wheels. The drum acts as a gear member to transmit rotation to sprockets of much smaller diameter than the drum and affixed to the front and rear axles. A rider standing on the drum may rotate it with his feet, thereby rotating both axles and all four wheels. A second embodiment is similar to the first except that the relatively wide drum is replaced by a wheel; rather than standing on the drum and rotating it with a walking action, the rider engages spokes on the wheel successively with inwardly directed members attached to his feet, or steps on outward projections affixed to the wheel.

In a third embodiment, hand and foot operated cranks rotate sprockets connected by chain drives to similar sprockets affixed to the front and rear axles. In a fourth embodiment, a somewhat larger vehicle, primarily intended to carry and be propelled by two or more riders, includes a gear segment attached to and extending downwardly from each end of a beam mounted for rotation about its center. The gear segments engage ratchet-equipped sprockets on the front and rear axles, whereby reciprocating motion of the beam by riders sitting upon or standing at each end thereof is transmitted to unidirectional rotation of the buoyant wheels.

In some embodiments the axles are divided into right and left, independently rotatable portions for steering purposes.

DETAILED DESCRIPTION

Figure 1:
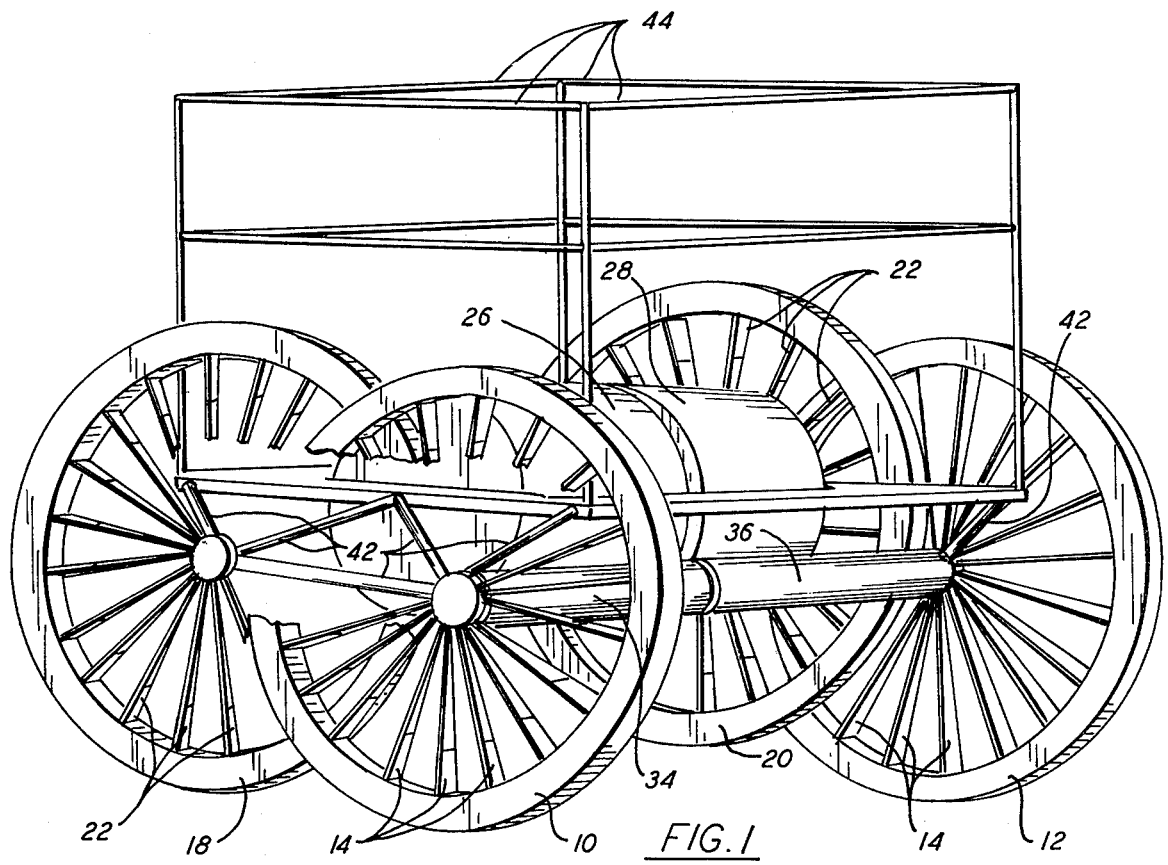
FIG. 1 is a perspective view of a first embodiment of a water vehicle of the invention.
Figure 2:
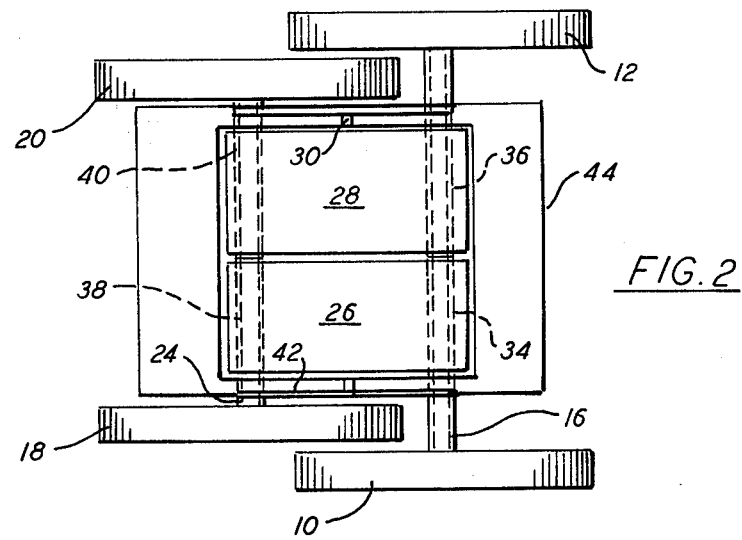
FIG. 2 is a plan view of the vehicle of FIG. 1.

Referring now to the drawings, the aquatic vehicle of FIGS. 1 and 2 includes a pair of front wheels, made up of buoyant rim portions 10 and 12, each attached by spokes 14 to the hubs of the wheels which are mounted upon front axle 16, and a pair of rear wheels having buoyant rim portions 18 and 20, connected by spokes 22 to the hubs of the wheels which are mounted upon rear axle 24. Spikes 14 and 22 on both the front and rear pairs of wheels have a lateral width at least equal to that of the associated wheels, (as shown) or may include outwardly projecting portions, to provide a paddle-like function as the wheels are rotated while partly submerged. The construction and/or material of rim portions 10, 12, 18 and 20 is such as to provide the necessary buoyancy for keeping the vehicle and a nominal load of, e.g., 200 lbs. afloat. Depending upon the particular construction and/or materials of the rim portions, relative dimensions indicated in the drawings may be considerably altered. Preferably, buoyancy is such that the vehicle and its load will be submerged to a depth not greater than the front and rear axles. In this manner, only rotating parts which contribute to propulsion of the vehicle over the water are submerged and undesirable drag from non-rotating parts is avoided.

In the illustrated version, a pair of drums 26 and 28 are coaxially mounted in close, side-by-side relation for independent rotation about axle 30. A single drum may be used in lieu of the pair of drums, but two drums are preferred because of the added control and steering capabilities provided thereby, as explained later. The peripheries of both of drums 26 and 28, across all or a portion of their width, are covered with high friction material, such as corrugated rubber or rubberized material, for direct, non-slip transmission of rotation of the drums to sprocket members 34 and 36, respectively, each mounted upon and affixed to front axle 16. The drums and sprockets may have meshing teeth, but in any case the drums act as gear members in transmitting rotation directly to the smaller diameter sprocket members, and thereby to the axles and wheels. Rotation is likewise transmitted by drums 26 and 28 to sprocket members 38 and 40 on rear axle 24.

Axles 16, 24 and 30 are all supported relative to one another, with axle 30 midway between and above axles 16 and 24, by suitable rigid framework 42 which incorporates any necessary journals or bearings to accommodate rotation of the axles. Also supported upon and generally above framework 42 is a square, fence-like enclosure including upper railing 44 at a convenient height and position to be grasped by a rider standing upon drum 26 and/or drum 28.

From the structure illustrated and described, it is apparent that a walking motion by a rider to produce rotation of drums 26 and 28 will transmit such rotation to wheels 10, 12, 18 and 20 in a direction opposite to that of drum rotation. Thus, a forward walking motion will produce rotation of the wheels in a direction to propel the vehicle in the same direction the rider is facing, due to reaction of the submerged portions of the wheels and spokes with the water. If substantially the same rotation is imparted to both drums in the same direction, the vehicle will be propelled in a straight direction, ignoring current or other such outside influences. Steering may be accomplished by slowing, stopping or reversing rotation of one of drums 26 and 28 relative to the other. It is necessary, of course, that axles 16 and 24 be constructed for independent rotation of the right and left portions.

Figure 3:
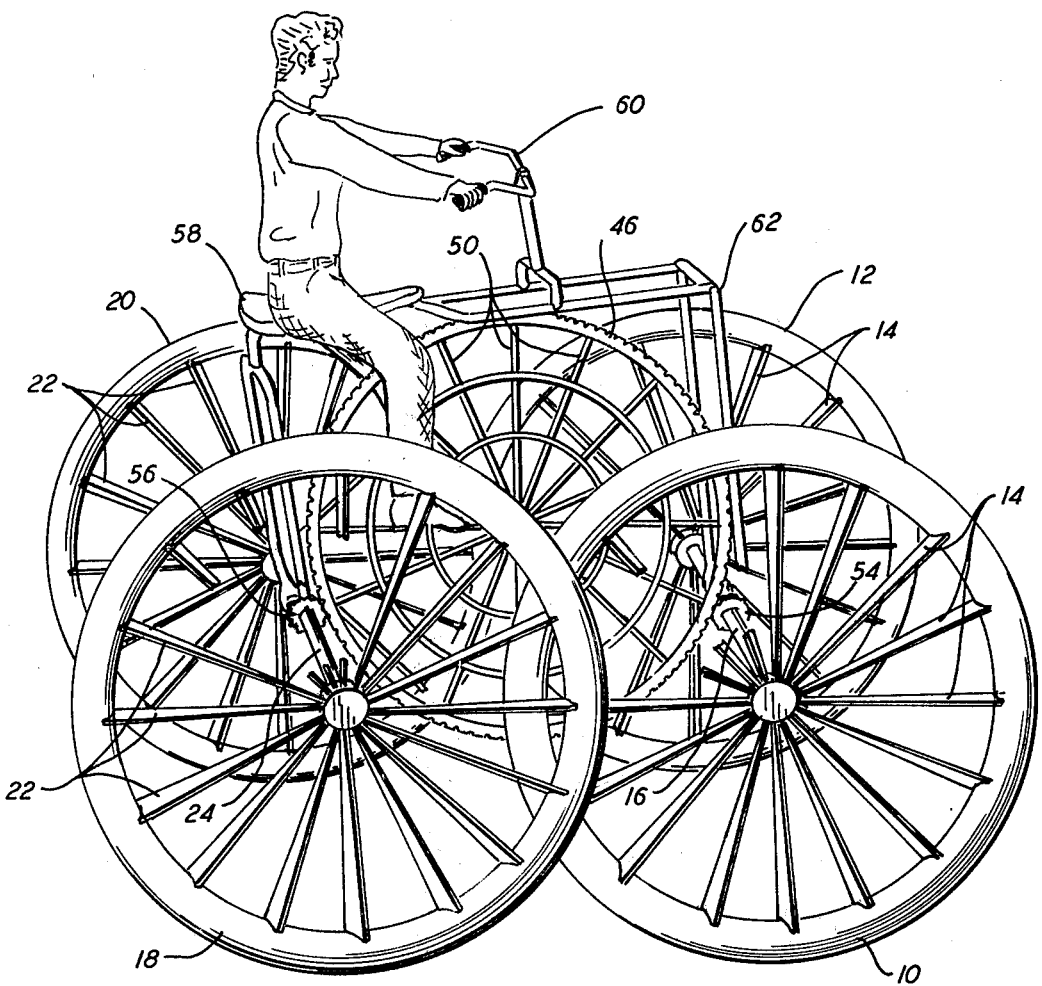
FIG. 3 is a perspective view of a second embodiment of the invention.
Figure 4:
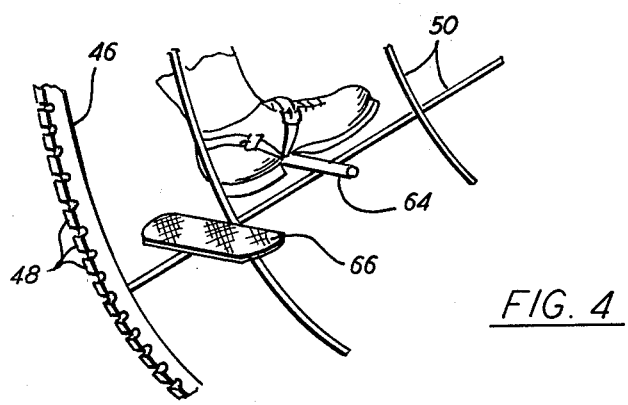
FIG. 4 is a fragmentary view of a portion of the apparatus of FIG. 3 showing the manner of propulsion thereof by the feet of the operator.

Turning now to FIGS. 3 and 4, a second embodiment of the aquatic vehicle is shown. Reference numerals common to the first embodiment are used for buoyant rim portions 10 and 12 and spokes 14 of the front wheels, rim portions 18 and 20 and spokes 22 of the rear wheels, and front and rear axles 16 and 24, respectively. In place of the rotatable drums, the present embodiment incorporates as a primary drive gear wheel 46 having teeth 48 about its entire periphery, and supported by spoke structure 50 for rotation about a central axle. Framework 52 supports axles 16 and 24 relative to one another and to the axle of wheel 46 in such a manner that teeth 48 mesh with similar teeth on gear or sprocket members 54 and 56 on front and rear axles 16 and 24, respectively.

Seat 58 and handlebars 60 are mounted on additional framework 62, supported on axles 16 and 24 and/or framework 52. A rider seated upon seat 58 and grasping handlebars 60 is conveniently positioned to engage radially extending portions of spokes 50 with short pegs 64, firmly attached to his shoes and extending inwardly, as indicated in FIG. 4. Alternatively, step members 66 may be affixed to spokes 50, extending outwardly in both directions therefrom, for engagement by the feet of the rider to impart rotation to wheel 46. By engaging the wheel at a point remote from the axis, as in the case of the usual pedal crank, a great deal of mechanical advantage is gained, allowing the high gear ratios between teeth 48 and sprockets 54 and 56, whereby high rotational speeds may be imparted to the front and rear wheels. Although no steering means are specifically indicated in FIG. 3, it is apparent that conventional rudder means may be provided and controlled by handlebars 60, or other means.

Figure 5:
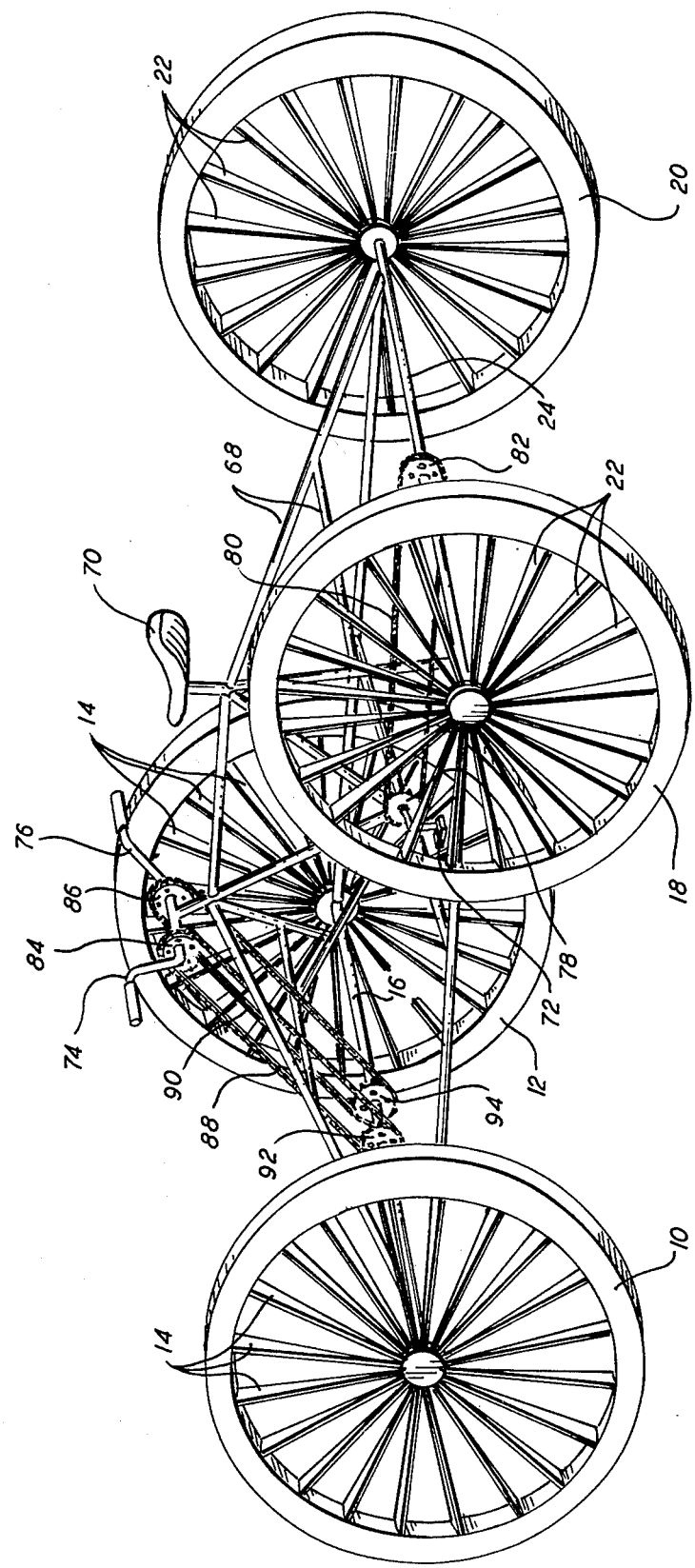
FIGS. 5 and 6 are perspective views of additional embodiments.

The embodiment of FIG. 5 again includes front and rear pairs of wheels having buoyant rim portions 10, 12, 18 and 20, spokes 14 and 22, and front and rear axles 16 and 24, respectively. Framework 68 supports the front and rear axles relative to one another and also supports seat 70 and the axles of foot pedal crank 72 and hand cranks 74 and 76. Foot pedal crank 72 is attached to drive sprocket 78, which is operatively connected by chain 80 to driven sprocket 82. The latter is mounted upon rear axle 24 for direct rotation thereof.

Hand cranks 74 and 76 are attached to independently rotatable sprockets 84 and 86, respectively, which in turn are connected by chains 88 and 90 to driven sprockets 92 and 94. Front axle 16 is divided between sprockets 92 and 94 into independently rotatable right and left portions. Thus, rotation is imparted to the rear wheels by the rider's movement of foot pedal crank 72 and to the front wheels by movement of hand cranks 74 and 76 to propel the vehicle over the surface of the water. Steering is provided by independent operation of hand cranks 74 and 76 to vary the relative speed or direction of rotation of the front wheels.

Figure 6:
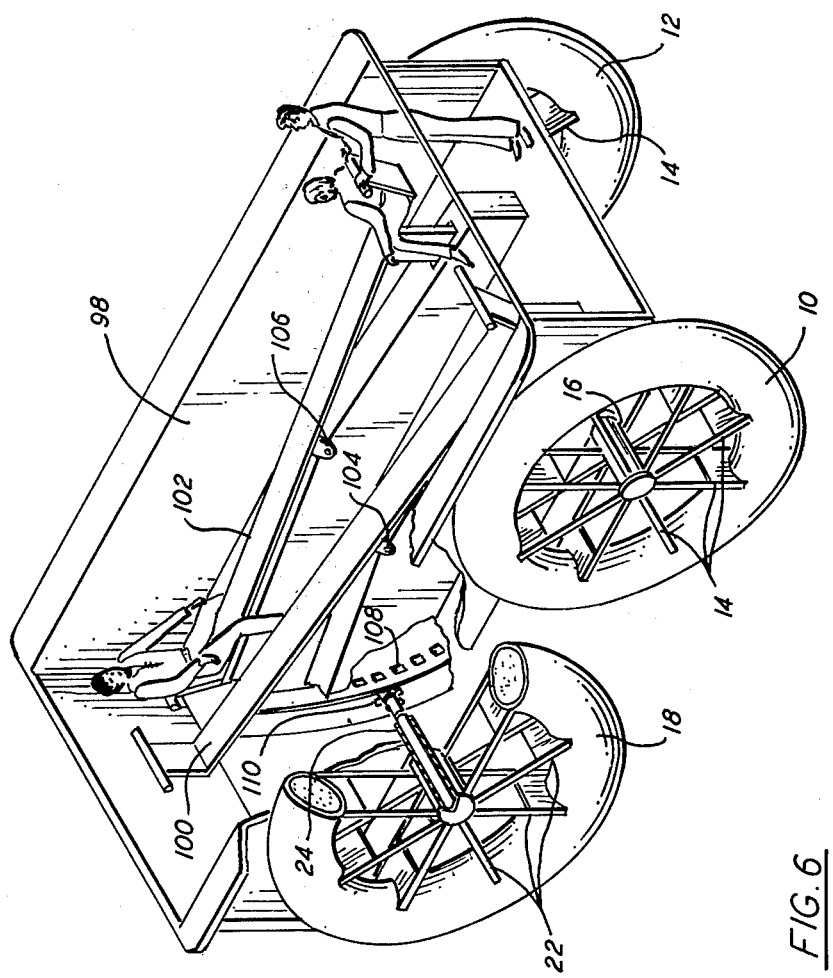

Turning now to FIG. 6, front and rear wheels, spokes and axles are provided as in the earlier described embodiments and, although illustrated in somewhat different detail, the common reference numerals are maintained. In addition to that provided by the wheels, buoyancy may also be provided in the present embodiment by tub-like enclosure 98, having bottom and side walls and open at the top, supported upon and serving as a framework for front and rear axles 16 and 24.

Beams 100 and 102 are supported within enclosure 98 for rotation about a common axis at their midpoints at 104 and 106. Attached to and extending downwardly from both ends of each of beams 100 and 102 are arcuate members, one of which is pictured in FIG. 6 and denoted by reference numeral 108. Member 108 serves as a drive gear by engaging teeth on sprocket 110 on axle 24, through meshing teeth, openings, or other means associated with member 108. Sprocket 110 engages axle 24 through appropriate ratchet means of conventional design, whereby reciprocating rotation of sprocket 110 by like movement of member 108 produces rotation of axle 24 in only one direction. Other ratchet-equipped sprockets (not shown) are provided for engagement by each of the arcuate members.

In the illustrated version, wherein two beams are provided, axles 16 and 24 are divided at their midpoints into independently rotatable right and left portions. Reciprocal movement of beam 100 about pivot point 104 in see-saw fashion moves arcuate member 108 and the corresponding member on the other end of beam 100 to provide rotation of one side of each of axles 16 and 24 to rotate wheels 12 and 20. Reciprocal movement of beam 102 in similar fashion results in rotation of wheels 10 and 18. Arcuate member 108 and the arcuate members connected to the other end of beam 100 and those connected to beam 102 are all curved about a radius emanating from the pivot points of the respective beams. The provision of two beams and split axles allows steering by changing the relative speed of rotation of the wheels on opposite sides of the vehicle, as described in connection with earlier embodiments, although a single beam could be used with a rudder or other steering means provided in conventional fashion. Reciprocating rotation of the beams may be provided by riders sitting upon the beams and/or manual engagement of handles attached thereto, as indicated in FIG. 6.

What is claimed is:

1. An aquatic recreational vehicle powered by one or more riders and comprising, in combination:
   (a) at least one pair of forward wheels mounted on and rotatable by a common front axle;
   (b) at least one pair of rear wheels mounted on and rotatable by a common rear axle;
   (c) means providing sufficient buoyancy to support said vehicle and rider(s) upon a body of water;
   (d) frame means connecting said front and rear axles;
   (e) at least one sprocket on each of said front and rear axles for transmitting rotation thereto in at least one direction;
   (f) at least one gear member supported relative to said frame means for rotation by said rider(s); and
   (g) means for transmitting rotation of said gear member to both said sprockets.

2. The invention according to claim 1 wherein at least one of said front and rear axles is divided into independently rotatable right and left portions, each having one of said sprockets thereon, and at least two of said gear members are provided for respectively imparting rotation to said sprockets on said right and left axle portions.

3. The invention according to claims 1 or 2 wherein at least two of said gear members are provided, one being positioned for rotation by the feet and the other by the hands of said rider.

4. The invention according to claims 1 or 2 wherein said means for transmitting rotation comprises an endless chain passing around said gear member(s) and said sprockets and engaging teeth on each.

5. The invention according to claims 1 or 2 wherein said gear member comprises at least one drum mounted for rotation about an axis parallel to and intermediate of said front and rear axles, said drum having an axial dimension sufficient to support at least one rider standing thereon for rotation of said drum by walking action.

6. The invention according to claim 1 wherein said gear member comprises a fifth wheel mounted for rotation about an axis parallel to and intermediate of said front and rear axles, and engagement members extending laterally from one of said fifth wheel and the feet of said rider for rotation of said fifth wheel by engagement of the rider's feet therewith at points remote from the axis of rotation thereof.

7. The invention according to claim 1 wherein said gear member comprises a fifth wheel mounted for rotation about an axis parallel to and intermediate of said front and rear axles, and engagement members extending laterally from one of said fifth wheel and the feet of said rider for rotation of said fifth wheel by movement of the rider's feet, and said means for transmitting rotation comprises teeth on said fifth wheel engaging said toothed sprockets on both said front and rear axles.

8. The invention according to claims 1 or 2 wherein said gear member comprises at least one forward and one rear arcuate segment, mounted for common, reciprocating rotation about a common axis parallel to and intermediate of said front and rear axles.

9. The invention according to claims 1 or 2 wherein said gear member comprises at least one forward and one rear arcuate segment mounted upon opposite ends of a beam supported for rotation about an axis midway between said segments and parallel to and intermediate of said front and rear axles, and said means for transmitting rotation comprises means on said segments engaging teeth on said sprockets and further comprising means for transmitting rotation of said segments to said front and rear axles in one direction only.

* * * * *